(12) United States Patent
Darvish et al.

(10) Patent No.: US 7,333,884 B2
(45) Date of Patent: Feb. 19, 2008

(54) ROLLOVER DETECTION SYSTEM

(75) Inventors: Abtin Darvish, Wuppertal (DE);
Markus Falkner, Breitscheid (DE);
Jens Haun, Bochum (DE)

(73) Assignee: Delphi Technologies, Inc., Troy, MI (US)

( * ) Notice: Subject to any disclaimer, the term of this patent is extended or adjusted under 35 U.S.C. 154(b) by 314 days.

(21) Appl. No.: 11/173,763

(22) Filed: Jul. 1, 2005

(65) Prior Publication Data

US 2006/0009896 A1 Jan. 12, 2006

(30) Foreign Application Priority Data

Jul. 9, 2004 (EP) .................................. 04016272

(51) Int. Cl.
*B60R 22/00* (2006.01)
(52) U.S. Cl. ........................ 701/45; 701/46; 180/271; 280/734; 340/439
(58) Field of Classification Search .................. 701/45, 701/46, 47; 180/268, 271; 280/734, 735; 340/438, 439
See application file for complete search history.

(56) References Cited

U.S. PATENT DOCUMENTS 5,890,084 A 3/1999 Halasz et al.
6,031,484 A 2/2000 Bullinger et al.

FOREIGN PATENT DOCUMENTS

DE 196 47 660 5/1998
DE 199 61 799 7/2001
DE 102 12 963 10/2003

*Primary Examiner*—Gertrude A. Jeanglaude
(74) *Attorney, Agent, or Firm*—Jimmy L. Funke

(57) ABSTRACT

A rollover detection system for a vehicle comprises at least one sensor for the detection of the angle of rotation of the vehicle and/or at least one angular rate sensor, an electronic control device connected to the sensors as well as at least one safety device which can be activated via the control device in the event of a rollover scenario detected with reference to the sensor data. At least one irreversible safety device and at least one reversible safety device are provided. The control device distinguishes between at least one stage of a lower degree of severity and at least one stage of a higher degree of severity of the rollover scenario in the detection of a respective rollover scenario with reference to the sensor data in order to activate at least one reversible safety device in the case of a lower degree of severity and to activate at least one irreversible safety device in the case of a higher degree of severity.

15 Claims, 4 Drawing Sheets

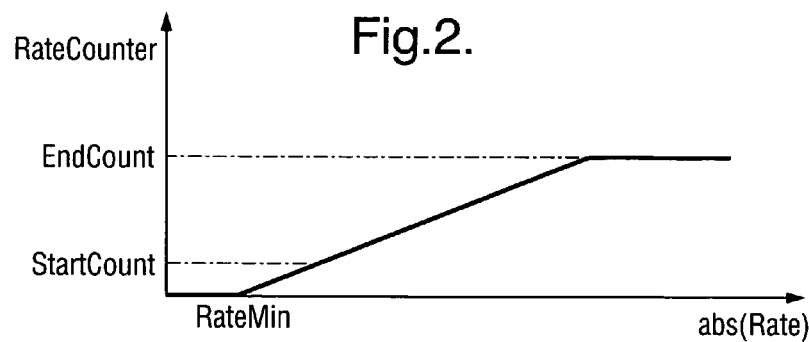
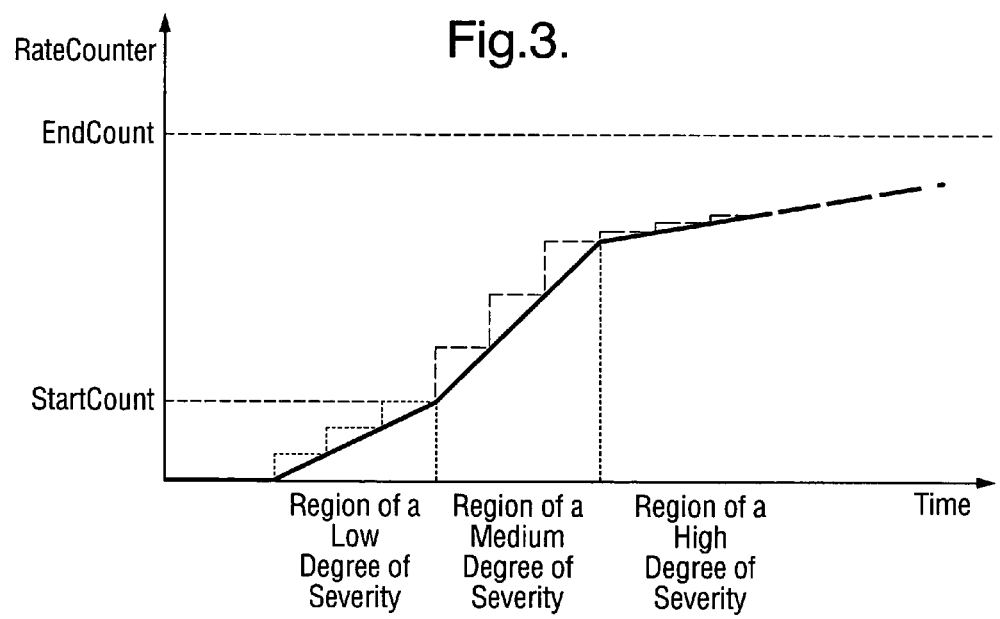
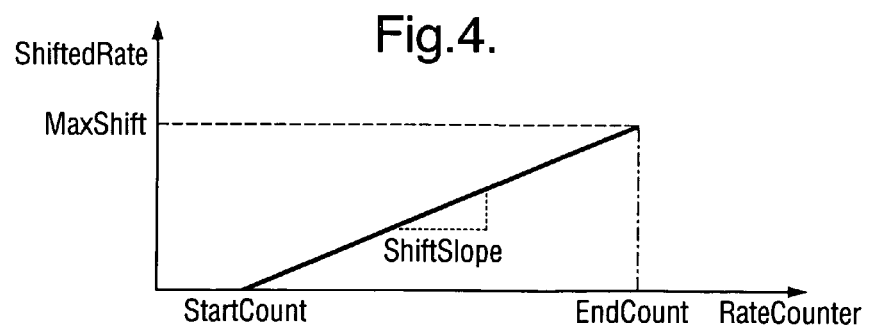

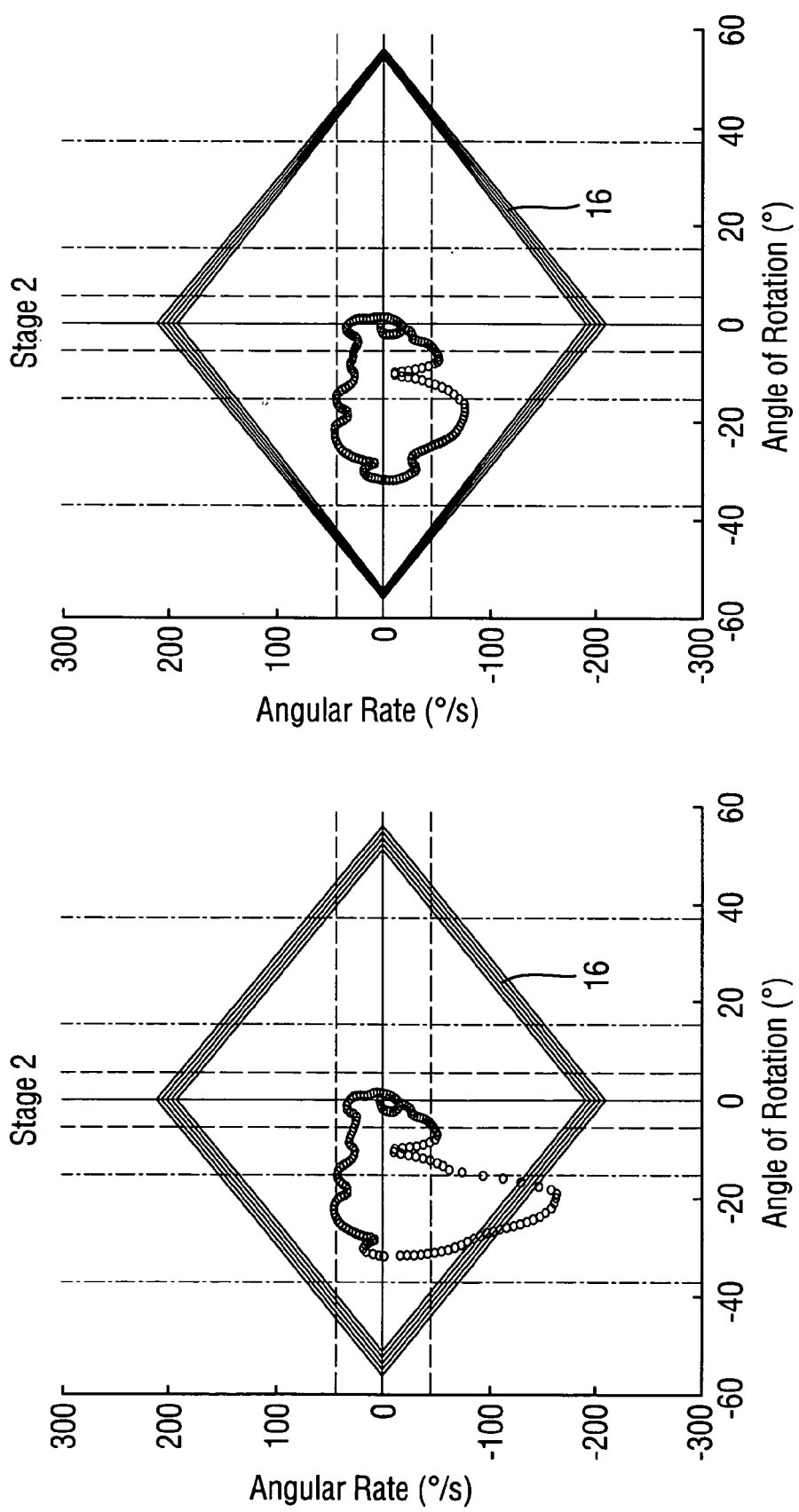

ROLLOVER DETECTION SYSTEM

TECHNICAL FIELD

The invention relates to a rollover detection system for a vehicle comprising at least one sensor for the detection of the angle of rotation of the vehicle and an angular rate sensor, an electronic control device connected to the sensors as well as at least one safety device which can be activated via the control device in the event of a rollover scenario detected with reference to the sensor data.

BACKGROUND OF THE INVENTION

In the previously known rollover detection systems, a one-step vehicle rollover detection algorithm is used, i.e. an algorithm in which a distinction is only made between the presence of a rollover scenario and the absence of such a rollover scenario. These previously usual vehicle rollover detection algorithms include, for example, the algorithm "WinGAMR2" (windowed gyroscope algorithm measuring rollover, Version 2). The known algorithms are accordingly not in a position to distinguish rollover scenarios from almost-rollover scenarios.

A normal rollover detection is based on two paths or signals independent of one another. The first path is formed by an output signal of a rollover detection algorithm which is based on physical values from different sensors which are provided in a rollover detection module. The sensors normally include a rollover sensor, a sensor for the detection of the vertical acceleration and one or two sensors for the detection of the lateral acceleration. The relevant physical data must be subjected to a pre-processing (filtering) before they are taken account of in some mathematical and/or physical manner in the detection algorithm.

The second path can be considered as an "activation" path with basic security algorithms. An accidental rollover detection going back to a single error in the main microprocessor of the system and accordingly an accidental activation of a respective safety device should thus be prevented. Both criteria, i.e. the criteria of both paths, must therefore always be satisfied for a respective rollover detection.

A substantial requirement for a good rollover detection algorithm consists of predicting a rollover scenario within an appropriate time period (some time before the reaching of the 90° rollover angle or angle of rotation). A decision must be made between "rollover" in a rollover scenario and "no rollover" in another, normal driving situation.

In specific driving situations, it is, however, difficult to distinguish between "rollover" and "no rollover". This is due to the fact, among other things, that in some situations the received signals are very low and develop rather slowly. Such scenarios can result in a rollover, or not.

Other situations moreover occur in which, when the signals develop very quickly and at high intensity, a rollover is expected a short time later or the vehicle falls back into its original position.

Generally, the safety of the vehicle occupants has the highest priority. If there is any doubt about the correct decision or if no clear distinction is possible between "rollover" and "no rollover", the respective scenario should be detected as "rollover" and the safety devices should be activated.

Some safety devices are now irreversible, which means that they have to be replaced after the respective activation. This is naturally more cost intensive than the activation of reversible safety devices.

SUMMARY OF THE INVENTION

It is the underlying object of the invention to provide an improved rollover detection system of the initially named kind in which the aforesaid problems have been eliminated. On the one hand, in particular an optimum rollover detection and a high occupant security should be ensured, whereas, on the other hand, a system which is as cost-favorable as possible is aimed for in particular by the avoidance of an unnecessary activation of irreversible safety devices.

This object is satisfied in accordance with the invention in that at least one irreversible safety device and at least one reversible safety device are provided; and in that the control device distinguishes between at least one stage of a lower degree of severity and at least one stage of a higher degree of severity of the rollover scenario in the detection of a respective rollover scenario with reference to the sensor data in order to activate at least one reversible safety device in the case of a lower degree of severity and to activate at least one irreversible safety device in the case of a higher degree of severity.

It is therefore possible to distinguish between two stages of different degrees of severity on the basis of this design in a respective rollover detection. The costs are correspondingly reduced in that reversible safety devices, which do not subsequently have to be replaced, are activated on the detection of stages of a lower degree of severity. In such scenarios in which an unambiguous distinction between "rollover" and "no rollover" is not possible, at least one stage of a lower degree of severity is initially detected. A detection of stages of a higher degree of severity only takes place when the degree of severity of the respective rollover scenario increases. Otherwise, the detection of one or more stages of a lower degree of severity is maintained so that only reversible safety devices are activated, which reduces the costs accordingly. An optimum rollover detection and occupant safety are thus ensured, on the one hand, whereas the costs are reduced, on the other hand, by avoiding unnecessary activation of irreversible safety devices.

Generally, on the detection of a respective rollover scenario, the control device can also distinguish between more than two stages of a different degree of severity of the rollover scenario.

On the detection of a respective rollover scenario, the control device preferably distinguishes between two or three stages of a different degree of severity.

In a preferred practical embodiment of the rollover detection system in accordance with the invention, the control device comprises an adaptive logical system in order to distinguish between the stages of a different degree of severity of a respective rollover scenario.

At least one signal derived from the sensor data can advantageously be changed at least regionally via the adaptive logic system in dependence on specific properties and/or on the development of this signal in order to effect the respective adaptation.

The signal derived from the sensor data can, for example, be representative for the development of the angular rate in dependence on the angle of rotation.

A respective safety device can advantageously be activated when the signal derived from the sensor data exceeds or falls below a pre-determinable threshold value. A variable threshold value is more expediently provided which is dependent on the respective angle of rotation and on the respective angular rate.

In an expedient practical embodiment of the rollover detection system in accordance with the invention, an irreversible safety device can in each case only be activated when the threshold value of a non-adapted signal derived from the sensor data is exceeded or is fallen below.

At least one reversible safety device can expediently be activated each time an adapted signal derived from the sensor data exceeds or falls below the threshold value.

A respective adaptation of the signal derived from the sensor data preferably takes place such that a respective stage of a lower degree of severity is detected prior to a respective stage of a higher degree of severity.

A respective adaptation of the signal derived from the sensor data expediently only takes place when the properties and/or the development of the signal correspond/s to criteria pre-settable via the adaptive logic system.

In a preferred practical embodiment of the rollover detection system in accordance with the invention, at least one sensor is provided for the detection of the lateral acceleration of the vehicle and/or at least one sensor is provided for the detection of the vertical acceleration of the vehicle. An activation signal can preferably be generated by means of the control circuit in dependence on the lateral acceleration and/or vertical acceleration, with a respective safety device only being able to be activated when the activation signal is also present.

The control device can be formed at least partly by the control apparatus of the respective vehicle.

BRIEF DESCRIPTION OF THE DRAWINGS

The invention will be explained in more detail in the following with reference to embodiments and to the drawing; there are shown in it:

FIG. 2 is a diagram in which the count of a rate counter "RateCounter" is shown over the absolute roll rate or angular rate "abs(Rate)".

FIG. 3 is a diagram in which the relationship between the stages of a different degree of severity and the count of the rate counter "RateCounter" are shown over time.

FIG. 4 is a diagram in which the shift of the angular rate "ShiftedRate" is shown over the count of the rate counter "RateCounter".

FIG. 6 is two diagrams in which, in each case, the angular rate is shown over the angle of rotation, with the relationships on the presence of an adapted signal or of a first stage, which can be a stage of a lower degree of severity, resulting from the left hand diagram and the relationships on the presence of the non-adapted original signal or of a second stage, which can be a stage of a higher degree of severity, resulting from the right hand diagram.

DESCRIPTION OF THE PREFERRED EMBODIMENT

Figure 1:
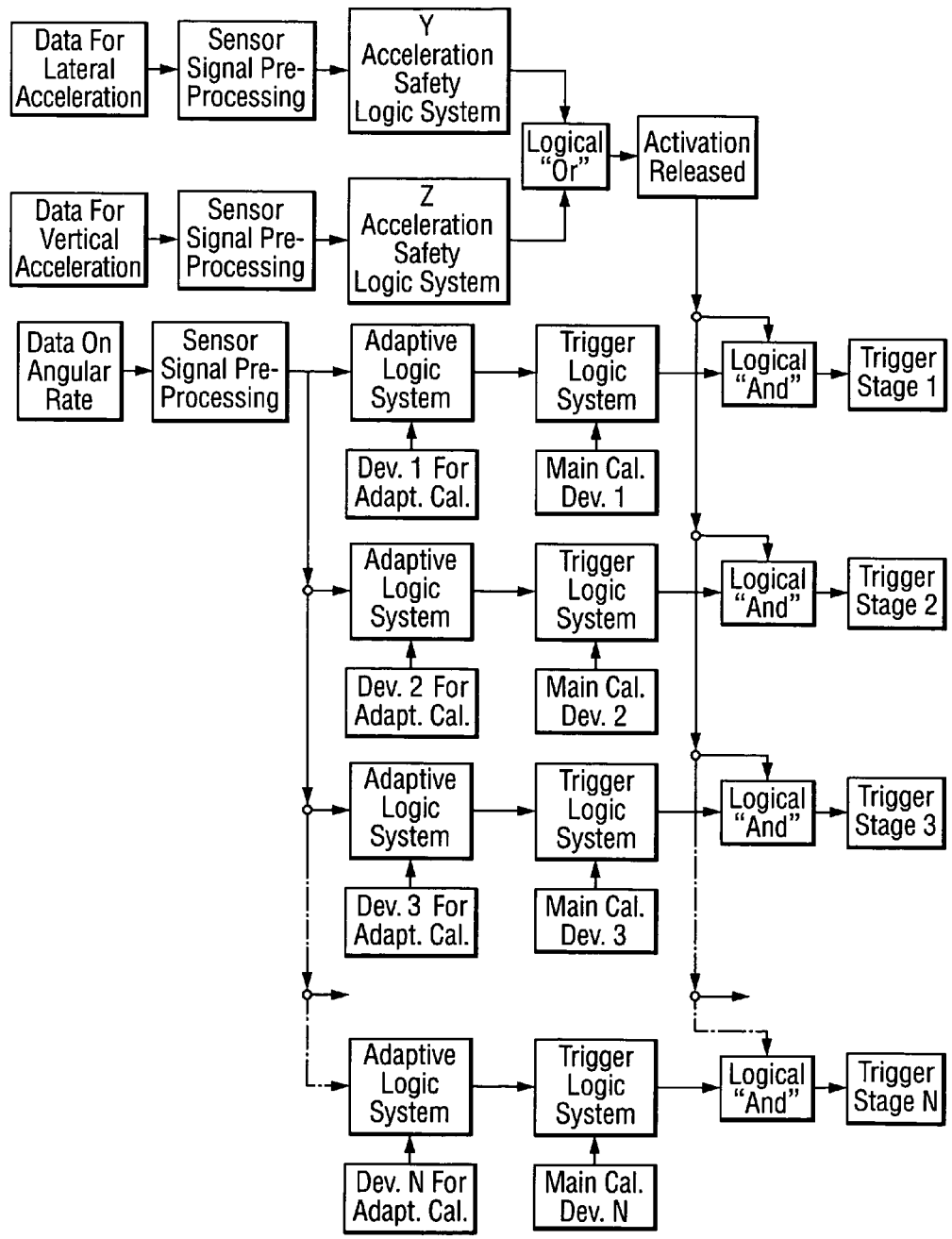
FIG. 1 is a schematic overview of an exemplary embodiment of the rollover detection system with an adaptive logic system.

FIG. 1 shows, in a schematic overview, an exemplary embodiment of a rollover detection system 10 for a vehicle, in particular for a motor vehicle.

The rollover detection system 10 includes at least one sensor for the detection of the angle of roll or angle of rotation of the vehicle and/or at least one angular rate sensor, an electronic control device 12 connected to this sensor or to these sensors, and at least one irreversible safety device and at least one reversible safety device.

The control device 12 distinguishes between at least one stage of a lower degree of severity and at least one stage of a higher degree of severity of the rollover scenario in the detection of a respective rollover scenario with reference to the sensor data in order to activate at least one reversible safety device in the case of a lower degree of severity and to activate at least one irreversible safety device in the case of a higher degree of severity.

In the present case, in the detection of a respective rollover scenario, the control device 12 distinguishes between more than two stages of different degrees of severity of the rollover scenario, i.e., for example, between any desired selection N of stages of different degrees of severity of the rollover scenario.

As can be recognized with reference to FIG. 1, the control device 12 comprises an adaptive logical system 14 in order to distinguish between the stages of a different degree of severity of a respective rollover scenario.

At least one signal derived from the sensor data, in particular from sensor data with respect to the angular rate and/or to the angle of rotation, can be changed at least regionally via the adaptive logic system 14 in dependence on specific properties and/or on the development of this signal in order to effect the respective adaptation. The signal derived from the sensor data can in particular be representative of the development of the angular rate in dependence on the angle of rotation.

A respective safety device can preferably be activated when the signal derived from the sensor data—for example, with respect to the angular rate and/or to the angle of rotation—exceeds or falls below a pre-settable threshold value. A variable threshold value can in particular be provided which is dependent on the respective angle of rotation and on the respective angular rate.

An irreversible safety device is preferably only activated when the threshold value is exceeded or is fallen below by a non-adapted signal derived from the sensor data on, for example with respect to the angular rate and/or the angle of rotation. At least one reversible safety device can preferably be activated each time an adapted signal derived from the respective sensor data exceeds or falls below the threshold value.

A respective adaptation of the signal derived from the respective sensor data can in particular take place such that a respective stage of a lower degree of severity is detected prior to a respective stage of a higher degree of severity.

A respective adaptation of the signal derived from the respective sensor data expediently only takes place when the properties and/or the development of the signal correspond to criteria pre-settable via the adaptive logic system 14.

In the present case, at least one sensor is moreover provided for the detection of the lateral acceleration of the vehicle and/or at least one sensor is provided for the detection of the vertical acceleration of the vehicle. An activation signal will preferably be able to be generated by means of the control circuit 12 in dependence on the lateral acceleration and/or vertical acceleration, with a respective safety device only being able to be activated when the activation signal is also present.

As can be recognized with reference to FIG. 1, in the present embodiment, data on the angular rate are first supplied to sensor signal pre-processing. The output signal of the sensor signal pre-processing is then supplied to the different sections of the adaptive logic system 14 associated with the different stages. A respective device for adaptive calibration is associated with the different sections of the adaptive logic system 14, with this in particular also being able to be a separate set of parameters. The output signals of the different sections of the adaptive logic system 14 are each supplied to a triggering logic system with an associated main calibration device.

The output signals of the different triggering logic circuits or sections are each supplied to a logical "AND" element to which the output signal of an activation section of the electronic control 12 is moreover supplied via which an activation can be released. The input of the circuit section responsible for a release of the activation is connected to a logical "OR" element which is acted on by the output signal of a Y acceleration safety logic system and by the output signal of a Z acceleration safety logic system. The output signal of a sensor signal pre-processing is supplied to the Y acceleration safety logic system and data with respect to the lateral acceleration of the vehicle are subjected to pre-processing by means of said sensor signal pre-processing. The output signal of a sensor signal pre-processing is supplied to the Z acceleration safety logic system and data with respect to the vertical acceleration of the vehicle are pre-processed by means of said sensor signal pre-processing.

A respective safety device can therefore only be activated when the activation signal is also present. Activation is only released when a corresponding signal is delivered either from the Y acceleration safety logic system or from the Z acceleration safety logic system.

A triggering stage via which a respective safety device can be activated is disposed downstream of the different logical "AND" elements.

A distinction is therefore made between stages of different degrees of severity within one and the same rollover scenario. An adaptive logical system 14 can, for example, be provided for this purpose which takes account of the properties and the development of corresponding signals and effects an adaptation of the original signals. The original signals can be shaped in specific regions to the extent this is desired. If the properties and the development of the original signals do not correspond to the criteria of the adaptive logical system 14, no adaptation takes place, i.e. the original signals remain unchanged.

The further definition of a respective stage of a degree of severity is specific to the user. The order of the stage numbering (stage naming) can differ from application to application, with stage 1 being able to be the stage with the highest degree of severity in certain applications and being able to be the stage of the lowest degree of severity in other cases. In the embodiment shown in FIG. 1, the stage of the lowest degree of severity is called stage "1", whereas the stages of a higher degree of severity are called stages "2", "3", . . . .

Generally, any desired number N of stages of different degrees of severity can be provided, with two or three stages being able to be sufficient in practice.

The adaptive logical system 14 will be explained in more detail in the following:

The adaptive logic system 14 works in a manner such that, when the measured rate of roll or angular rate lies in a specific range (known as the stage of the degree of severity), an initialized counter can count up or down. The number of different stages can be selected as desired and can differ from application to application. The steps of a respective count increase or count reduction can also vary from one stage of the degree of severity to another. This independence permits a very flexible signal adaptation in a wide range.

The diagram in accordance with FIG. 2 reproduces the operation of the adaptive logic system 14 in a simple schematic representation. In this diagram, the count of a rate counter "RateCounter" is shown over the absolute roll rate or angular rate "abs(Rate)". If a minimum angular rate (RateMin) is exceeded, i.e. the stage of the lowest degree of severity is reached, the counter starts counting up, for example. The counting up lasts for so long until a maximum count is reached. The count is limited at this point in time. This is important to limit the adaptation in time. The adaptation starts as soon as the rate count "RateCounter" has exceeded the start count "StartCount". The rate count "RateCounter" is therefore limited by an end count "EndCount" when the count lies above the end count "EndCount".

Detailed information with respect to the logic system relating to the counting up or down of the counter can be seen from the diagram in accordance with FIG. 3. In particular the relationship between the stages of a different degree of severity and the count of the rate counter (RateCounter) shown over time can be seen from this diagram. Three stages of different degrees of severity can be seen whose count increments can be selected independently of one another. Generally, more stages of different degrees of severity with further count increments can also be provided. If necessary, a counting down can also take place within the stages.

Generally, it is also conceivable for the end count "EndCount" to be achieved only on the basis of one or two stages of degree of severity, since they are independent of one another.

FIG. 4 shows a diagram in which the shift of the angular rate "ShiftedRate" is shown over the count of the rate counter "RateCounter".

The adaptation (shift of the angular rate "ShiftedRate") is a function of the rate count "RateCounter" over time and is dependent on the maximal adaptable rate "MaxShift". The higher the rate count "RateCounter", the larger the adaptation range. The adaptation is limited by the maximal adaptable rate "MaxShift" which should be selected in a suitable range.

The rate shift "ShiftedRate" results from the following relationship:

$$ShiftedRate=[MaxShift/(EndCount-StartCount)]\cdot(RateCounter-StartCount)$$

The shift of the angular rate "ShiftedRate" is the value which is optionally added to the originally measured angular rate value. It is the result of the offset increase multiplied by the difference between "RateCounter" and "StartCount" when "RateCounter" is larger than "StartCount".

Practically any desired adaptation is possible with the parameters stage of degree of severity "SeverityStage", count step "CountStep", start count "StartCount", end count "EndCount" and maximum shift "MaxShift". This is a substantial advantage of the flexible and easily calibratable adaptive logic system 14.

Figure 5:
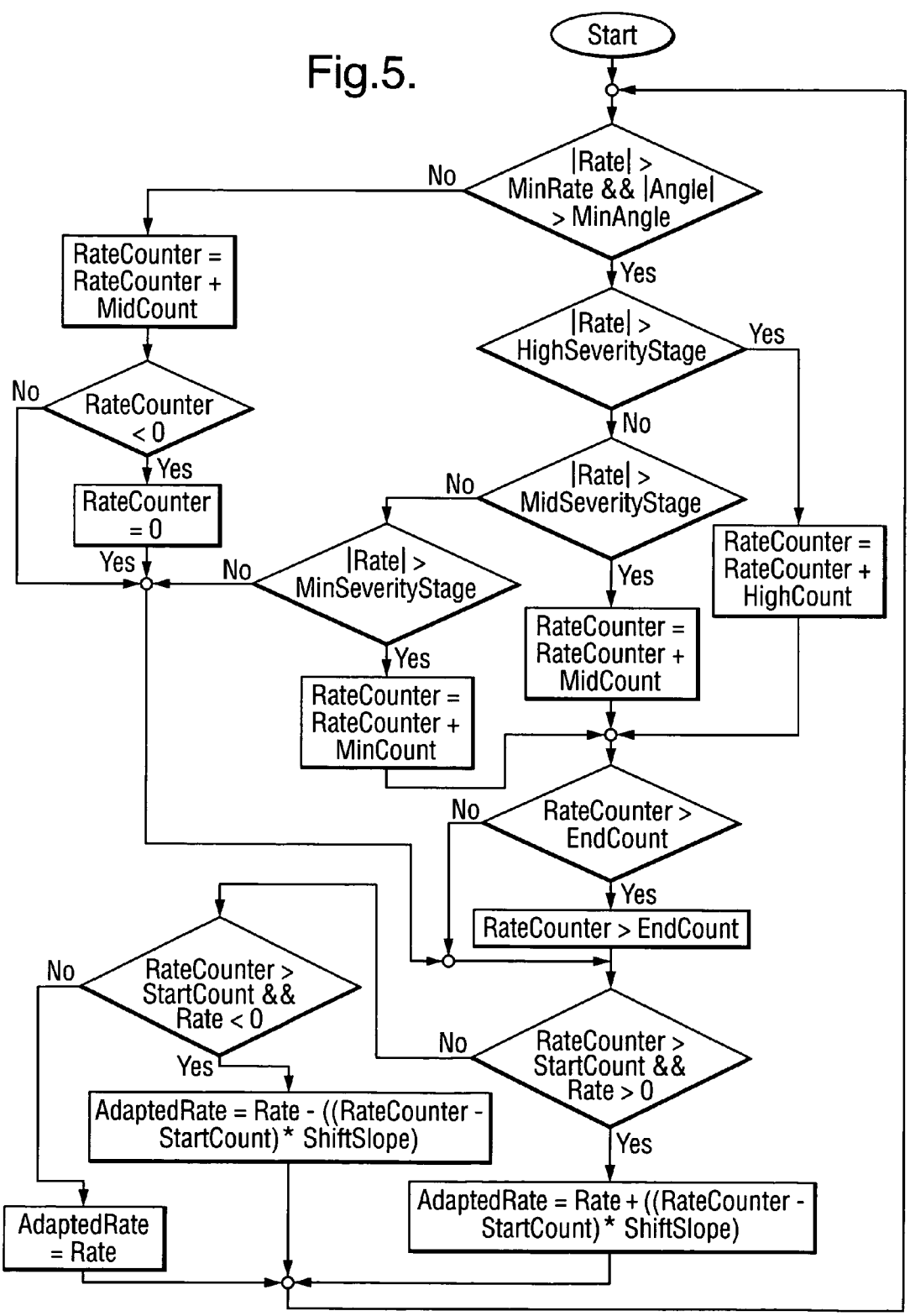
FIG. 5 is a flowchart of the adaptive logic system.

FIG. 5 shows a flowchart of the adaptive logic system 14. The following parameters are taken into account in this flowchart:

amount of the angular rate "|Rate|"
minimum rate "MinRate"
amount of the angle of rotation "|Angle|"
minimum angle of rotation "MinAngle"
rate count "RateCounter"
minimum count "MinCount"
stage of a high degree of severity "HighSeverityStage"
stages of a medium degree of severity "MidSeverityStage"
high count "HighCount"

stage of the lowest degree of severity "MinSeverityStage"
medium count "MidCount"
end count "EndCount"
start count "StartCount"
adapted rate "AdaptedRate"
angular rate "Rate"
adapted rate "AdaptedRate"
shift slope "ShiftSlope"

In addition, a respective logical "AND" is symbolized by the signs "&&" used in the flowchart.

FIG. 6 shows two diagrams in which the angular rate is shown over the angle of rotation. The relationships on the presence of an adapted signal or of a first stage, which is a stage of a lower degree of severity, result from the left hand diagram. In contrast, the relationships on the presence of the non-adapted original signal or of a second stage, which is a stage of a higher degree of severity, can be seen from the right hand diagram.

In the present case, the respective rollover detection system is therefore a two-stage detection system in which e.g. stage 1 is defined as a stage of a lower degree of severity and stage 2 is defined as a stage of a higher degree of severity.

Stage 1 can be configured more sensitively and be compressed, for example, for a rollover detection approximately 50 to 100 msec prior to a detection of stage 2.

In the present embodiment, the adaptive logic system 14 is moreover configured such that stage 1 of a respective rollover scenario is detected when an angle of rotation of approximately 40° is reached with a minimum angular rate above approximately 10°/sec. No stage 2 should be detected for such rollover scenarios since the situation should be classified as an "almost rollover". The multi-stage adaptive logic system 14 has therefore here been adapted to a two-stage adaptive logic system, for example, with special parameter values which take account of the pre-settable time procedures of the detection. The following parameters were selected, for example:

"MinRate"=45°/sec
"Min Angle"=0°
"StartCount"=10
"EndCount"=40
"MaxShift"=90°/sec
"MinSeverityStage"=45°/sec
"MidSeverityStage"=60°/sec
"HighSeverityStage"=120°/sec
"MinCount"=1
"MidCount"=5
"HighCount"=2

In the present case, for example, the main rollover detection algorithm "WINGAMR2" (windowed gyroscope algorithm measuring rollover, Version 2) is used, supplemented by the adaptive logic system 14 in accordance with the invention. Generally, the adaptive logic system 14 in accordance with the invention can, however, also be used for any other rollover algorithms.

The behavior of the above application results from the two diagrams in accordance with FIG. 6. The left hand diagram shows an adapted angular rate over the angle of rotation (stage 1). The right hand diagram shows the non-adapted angular rate over the angle of rotation (stage 2).

The quadrangles in the two diagrams represent the respective threshold values 16 on whose exceeding or falling below the respective safety devices are activated.

In the case shown, the adaptive stage 1 of a lower degree of severity (cf. the left hand diagram of FIG. 6) is detected, which brings about the activation of a reversible safety device. In contrast, stage 2 (cf. the right hand diagram of FIG. 6) is not adaptive, which means that the signal values correspond to the original values. This stage 2 does not result in a corresponding rollover detection in the present case. A corresponding rollover detection only takes place when a respective threshold value 16 is exceeded or fallen below. A respective point of intersection can be set visually, for example.

The invention claimed is:

1. A rollover detection system for a vehicle comprising at least one sensor for the detection of the angle of rotation of the vehicle and/or at least one angular rate sensor, an electronic control device connected to the sensors as well as at least one safety device which can be activated via the control device in the event of a rollover scenario detected with reference to the sensor data, characterized in that at least one irreversible safety device and at least one reversible safety device are provided; and in that the control device distinguishes between at least one stage of a lower degree of severity and at least one stage of a higher degree of severity of the rollover scenario in the detection of a respective rollover scenario with reference to the sensor data in order to activate at least one reversible safety device in the case of a lower degree of severity and to activate at least one irreversible safety device in the case of a higher degree of severity.

2. A rollover detection system in accordance with claim 1, characterized in that, on the detection of a respective rollover scenario, the control device distinguishes between more than two stages of a different degree of severity of the rollover scenario.

3. A rollover detection system in accordance with claim 1 or claim 2, characterized in that, on the detection of a respective rollover scenario, the control device distinguishes between two or three stages of a different degree of severity of the rollover scenario.

4. A rollover detection system in accordance with claim 1, characterized in that the control device comprises an adaptive logic system in order to distinguish between the stages of different degrees of severity of a respective rollover scenario.

5. A rollover detection system in accordance with claim 4, characterized in that at least one signal derived from the sensor data can advantageously be changed at least regionally via the adaptive logic system in dependence on specific properties and/or on the development of this signal in order to effect the respective adaptation.

6. A rollover detection system in accordance with claim 5, characterized in that the signal derived from the sensor data is representative of the development of the angular rate in dependence on the angle of rotation.

7. A rollover detection system in accordance with claim 1, characterized in that a respective safety device can be activated when the signal derived from the sensor data exceeds or falls below a pre-determinable threshold value.

8. A rollover detection system in accordance with claim 7, characterized in that a variable threshold value is provided which is dependent on the respective angle of rotation and on the respective angular rate.

9. A rollover detection system in accordance with claim 1, characterized in that an irreversible safety device can only be activated when the threshold value is exceeded or is fallen below by a non-adapted signal derived from the sensor data.

10. A rollover detection system in accordance with claim 1, characterized in that at least one reversible safety device can be activated each time an adapted signal derived from the sensor data exceeds or falls below the threshold value.

11. A rollover detection system in accordance with claim 1, characterized in that a respective adaptation of the signal derived from the sensor data takes place such that a respective stage of a lower degree of severity is detected prior to a respective stage of a higher degree of severity.

12. A rollover detection system in accordance with claim 1, characterized in that a respective adaptation of the signal derived from the corresponding sensor data only takes place when the properties and/or the development of the signal correspond/corresponds to criteria pre-settable via the adaptive logic system.

13. A rollover detection system in accordance with claim 1, characterized in that at least one sensor is provided for the detection of the lateral acceleration of the vehicle and/or at least one sensor is provided for the detection of the vertical acceleration of the vehicle.

14. A rollover detection system in accordance with claim 13, characterized in that an activation signal can be generated by means of the control device in dependence on the lateral acceleration and/or vertical acceleration; and in that a respective safety device can only be activated when the activation signal is also present.

15. A rollover detection system in accordance with claim 1, characterized in that the control device is formed at least partly by the control apparatus of the vehicle.

* * * * *